United States Patent
Satou et al.

(10) Patent No.: US 6,685,597 B2
(45) Date of Patent: Feb. 3, 2004

(54) LINE PRESSURE CONTROL SYSTEM FOR AUTOMATIC TRANSMISSION

(75) Inventors: Tetsuya Satou, Fuji (JP); Hirofumi Michioka, Fujisawa (JP); Toshiya Mori, Fuji (JP)

(73) Assignee: Jatco Ltd, Fuji (JP)

( * ) Notice: Subject to any disclaimer, the term of this patent is extended or adjusted under 35 U.S.C. 154(b) by 0 days.

(21) Appl. No.: 10/133,025

(22) Filed: Apr. 26, 2002

(65) Prior Publication Data

US 2002/0177506 A1 Nov. 28, 2002

(30) Foreign Application Priority Data

Apr. 26, 2001 (JP) .......................... 2001-128818

(51) Int. Cl.[7] ................. F16H 61/26; F16H 41/04
(52) U.S. Cl. ................. 477/158; 477/115; 477/905
(58) Field of Search ................. 477/98, 115, 122, 477/156, 158, 159, 161, 905

(56) References Cited

U.S. PATENT DOCUMENTS

| | | | | |
|---|---|---|---|---|
| 5,261,295 A | * | 11/1993 | Iwanaga et al. | ............... 74/844 |
| 5,816,978 A | * | 10/1998 | Tabata et al. | ............... 477/156 |
| 6,016,456 A | * | 1/2000 | Yu | .......................... 477/156 X |
| 6,317,670 B1 | * | 11/2001 | Okada et al. | ............ 477/115 X |
| 2002/0082140 A1 | * | 6/2002 | Suehiro et al. | ............. 477/115 |

FOREIGN PATENT DOCUMENTS

| | | | |
|---|---|---|---|
| JP | 03-041256 | | 2/1991 |
| JP | 404157257 | * | 5/1992 ................. 477/158 |
| JP | 04-366059 | | 12/1992 |
| JP | 406229464 | * | 8/1994 ............ 477/158 X |
| JP | 09-303541 | | 11/1997 |

* cited by examiner

*Primary Examiner*—Roger Pang
(74) *Attorney, Agent, or Firm*—Klarquist Sparkman LLP

(57) ABSTRACT

A line pressure control system for an automatic transmission wherein a shift range is determined by selectively engaging friction elements by means of a line pressure controlled according to an input torque of said automatic transmission. In the present invention, an engine output torque at the front stage of the automatic transmission is estimated from the operating condition. The input torque of the automatic transmission is calculated from the estimated engine output torque and the operation state of a torque converter. The calculated input torque of the automatic transmission is decreased during a predetermined time corresponding to an estimation response delay of the engine output torque after the engine is made in a no-load state, so as to properly control the line pressure.

7 Claims, 4 Drawing Sheets

LINE PRESSURE CONTROL SYSTEM FOR AUTOMATIC TRANSMISSION

BACKGROUND OF THE INVENTION

1. Field of the Invention

The present invention relates to a line pressure control system for a shift control of an automatic transmission and, more particularly, to a line pressure control system for an automatic transmission, which is capable of properly controlling the line pressure even during a change in the engine load.

2. Description of Related Art

An automatic transmission, which determines a power transmission path (hence the gear ratio) of a gear transmission system by selectively engaging a plurality of friction elements (e.g., clutches, brakes) is usually designed so that the gear ratio can be changed by switching of the friction elements to be engaged. Since the engagement of the friction elements is achieved by selective supply of common line pressure, it is important to control the line pressure to a value according to an input torque of the automatic transmission, in order to avoid various potential problems.

For example, if the line pressure is insufficient with respect to the input torque of the transmission, the friction element tends to slip thereby causing a loss of power transmission besides degrading the durability of the friction element, while degrading the shift quality in that the actual shift is felt as being retarded. On the contrary, if the line pressure is excessively high with respect to the input torque of the transmission, the drive load of the oil pump for generating the line pressure becomes unnecessarily high, thereby deteriorating the fuel consumption of the engine and/or degrading the shift quality in that a large shift shock occurs upon shift operation.

In an attempt to overcome these problems, there have been proposed various methods for controlling the line pressure to a value according to the input torque of the automatic transmission. Thus, for example, JP 9-303541A discloses a shift control system wherein the output torque of the engine at the front stage of the automatic transmission is estimated from the engine rotational speed and the engine load (throttle valve opening) as taught by JP 3-41256A, and the input torque of the automatic transmission is calculated from the estimated engine torque and the operation state of a torque converter, so as to be used as the basis of the line pressure control.

According to the known shift control system described above, when the driver operates the accelerator pedal so as to change the engine load state, the estimation of the engine torque may not always be exact, thereby causing inaccurate line pressure control and resultant excess or deficiency thereof. In view of such additional problem, for example, JP 4-366059A proposes a line pressure control system, which estimates the engine torque when the accelerator pedal is depressed, by judging the engine load state from the throttle valve opening, but otherwise estimates the engine torque by judging the engine load state from the intake air amount or manifold vacuum of the engine. In other words, the known line pressure control system uses different parameters for estimation of the engine torque, which are optimum in terms of accuracy, for a condition in which the accelerator pedal is depressed and for other traveling conditions, respectively.

However, whichever parameter is used for estimation of the engine torque, the estimation necessarily has an estimation response delay with respect to an actual change in the engine torque, such that the instantaneous estimation value of the engine torque does not coincide with the actual engine torque. For this reason, the line pressure controlled based on the input torque of the automatic transmission, which in turn is calculated from the engine torque estimation value, tends to become excessive or deficient with respect to the actual transmission input torque. Thus, the known line pressure control system cannot avoid the above-mentioned problems that the drive load of the oil pump becomes unnecessarily high, thereby deteriorating the fuel consumption of the engine, and/or causing a large shift shock upon shift operation, besides an increased transmission loss, degradation of the durability of the friction element, and retarded feeling of the actual shift.

SUMMARY OF THE INVENTION

It is therefore a general object of the present invention to provide an improved line pressure control system for an automatic transmission, which eliminates the above-mentioned problems of the prior art.

It is a specific object of the present invention to provide an improved line pressure control system for an automatic transmission, in which the calculated value of the transmission input torque is adequately corrected when the engine load is decreased, so as to eliminate the excess of line pressure generated by the delay of the engine torque estimation with respect to the decrease in actual engine torque, and thereby avoid deterioration of the fuel consumption due to unnecessary increase in the oil pump drive load, and mitigate unpleasant shift shock.

According to the present invention, there is provided a line pressure control system for an automatic transmission wherein a shift range is determined by selectively engaging friction elements by means of a line pressure controlled according to an input torque of said automatic transmission, comprising:

estimation means for estimating an engine output torque at the front stage of said automatic transmission from the operating condition;

calculation means for calculating the input torque of said automatic transmission from the estimated engine output torque and the operation state of a torque converter; and correction means for decreasing the calculated input torque of said automatic transmission during a predetermined time corresponding to an estimation response delay of the engine output torque after said engine is placed in a no-load state, so as to control said line pressure.

With the line pressure control system according to the present invention, the line pressure for selectively engaging the friction elements to determine the shift range is controlled by estimating the output torque of the engine from the operating condition, calculating the input torque of the automatic transmission from the estimated engine torque and the operation state of the torque converter, and decreasing the calculated input torque of said automatic transmission during a predetermined time corresponding to an estimation response delay of the engine output torque after said engine is placed in a no-load state, so as to control said line pressure.

Therefore, according to the present invention, when the engine load is decreased, the calculated value of transmission input torque is decreased so as to eliminate the excess of line pressure generated by a delay of the engine torque estimation with respect to the decrease in the actual engine torque. It is thus possible to avoid deterioration of the fuel consumption due to unnecessary increase in the oil pump drive load, and also to mitigate unpleasant shift shock.

It is preferred that, during a predetermined time corresponding to the estimated response delay of the engine output torque, after the engine load has been transferred to a sudden increase state in which the increase rate of the load of the engine is not lower than a predetermined value, the input torque of said automatic transmission at the time of the highest engine torque that can be generated under the increased engine load is used for said line pressure control. In this instance, when the engine load is increased, the highest engine torque that can be generated under the increased engine load is used in place of the engine torque estimation value to carry out line pressure control. Therefore, it is possible to eliminate deficiency of the line pressure due to the delay of the engine torque estimation with respect to the increase in the actual engine torque, and to thereby solve the problems of the transmission loss and/or deterioration in terms of the durability or retarded sense of the shift operation.

In addition to the above, it is preferred that the predetermined rate relating to the increase rate of the engine load is varied according to the hydraulic oil temperature of the automatic transmission, and the predetermined rate is decreased as the hydraulic oil temperature decreases so as to enhance sensitivity of judgment for the engine load sudden increase state. In a low temperature condition of the hydraulic oil of the automatic transmission, the viscosity of the hydraulic oil is high and the transmission capacity of the torque converter is higher than at a high temperature condition. Therefore, the increase in actual engine torque caused by the increase in the engine load is easily transmitted to the transmission, and the above-mentioned problem due to the relative estimation delay of the engine torque becomes marked. Since, however, the sensitivity of engine load sudden increase judgment can be enhanced at a low temperature condition, in the manner described above, it is possible to readily perform the judgment of the engine load increase state in which the line pressure control should be carried out, notwithstanding the low temperature condition. It is therefore possible to effectively eliminate the above-mentioned problem caused by the estimation delay of engine torque, and thereby positively achieve the line pressure control at any oil temperature condition.

It is further preferred that the line pressure control based on the input torque of the automatic transmission at the time of the highest engine torque is performed only in a high rotation region in which the engine rotational speed is not lower than a predetermined value. In this instance, it is possible to effectively perform the line pressure control only in the high rotation region of the engine, in which a change in the actual engine torque is rapid and the problem caused by the relative estimation delay of engine torque becomes noticeable.

It is alternatively preferred that the line pressure control based on the input torque of said automatic transmission at the time of said highest engine torque is performed only in a high vehicle speed region in which a vehicle speed is not lower than a predetermined vehicle value. In this instance, it is possible to effectively perform the line pressure control in the high vehicle speed region, in which a change in the actual engine torque is rapid and the problem caused by the relative estimation delay of engine torque becomes noticeable.

BRIEF DESCRIPTION OF THE DRAWINGS

The present invention will be further explained below with reference to a preferred embodiment shown in the accompanying drawings.

DETAILED DESCRIPTION OF THE PREFERRED EMBODIMENT

Figure 1:
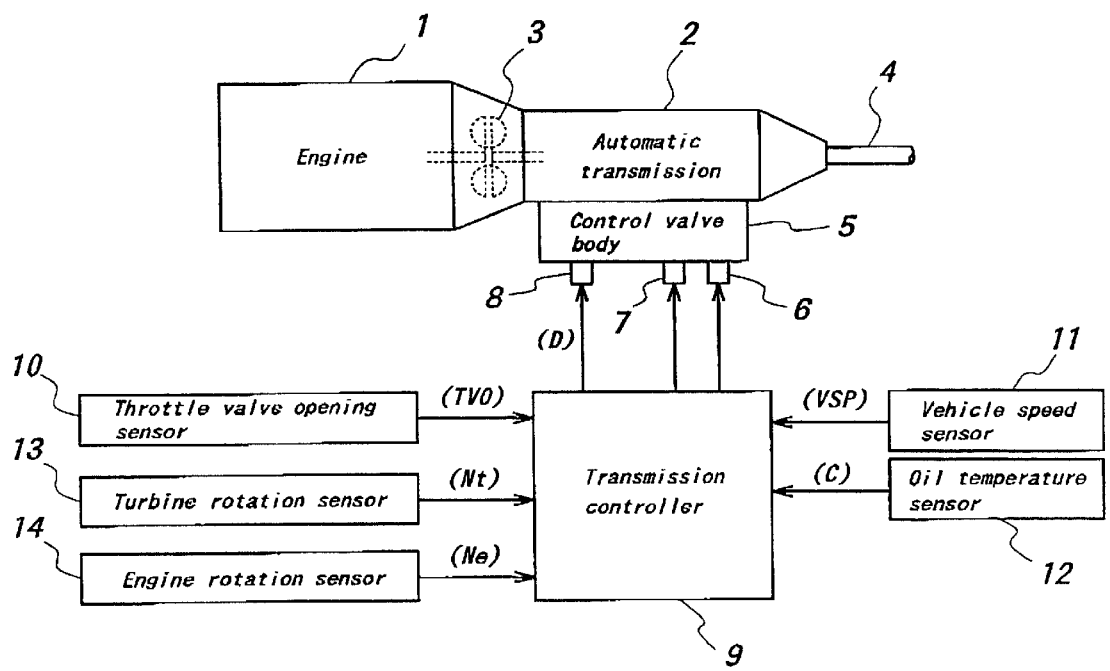
FIG. 1 is a schematic system diagram showing a vehicle power train having an automatic transmission provided with a line pressure control system in accordance with one embodiment of the present invention.

FIG. 1 shows a power train of a vehicle provided with a line pressure control system in accordance with one embodiment of the present invention, together with a control system for an automatic transmission. In FIG. 1, reference numerals 1 and 2 denote an engine and an automatic transmission, respectively. The automatic transmission 2 receives power from the engine 1 through a torque converter 3, changes the input rotation with a gear ratio according to the selected range and sends it to an output shaft 4.

In the automatic transmission 2, the selected range is determined by selectively operating a plurality of friction elements such as clutches and brakes, by the combination of ON and OFF states of shift solenoids 6 and 7 provided in a control valve body 5. The line pressure that governs the operation of the friction elements is determined by the duty control of a line pressure solenoid 8 similarly provided in the control valve body 5. The line pressure is increased from the lowest value to the highest value with an increase in a drive duty D of the line pressure solenoid 8.

The ON and OFF states of the shift solenoids 6 and 7 and the drive duty D of the line pressure solenoid 8 are controlled by a transmission controller 9. The transmission controller 9 receives a signal from a throttle valve opening sensor 10 for detecting the throttle valve opening TVO (engine load) of the engine 1, a signal from a vehicle speed sensor 11 for detecting the vehicle speed VSP from the rotational speed of the transmission output shaft 4, a signal from an oil temperature sensor 12 for detecting the transmission hydraulic oil temperature C, a signal from a turbine rotation sensor 13 for detecting the turbine rotational sped $N_t$, which is the output rotational speed of the torque converter 3 (transmission input rotational speed), and a signal from an engine rotation sensor 14 for detecting the rotational speed $N_e$ of the engine 1.

Figure 5:
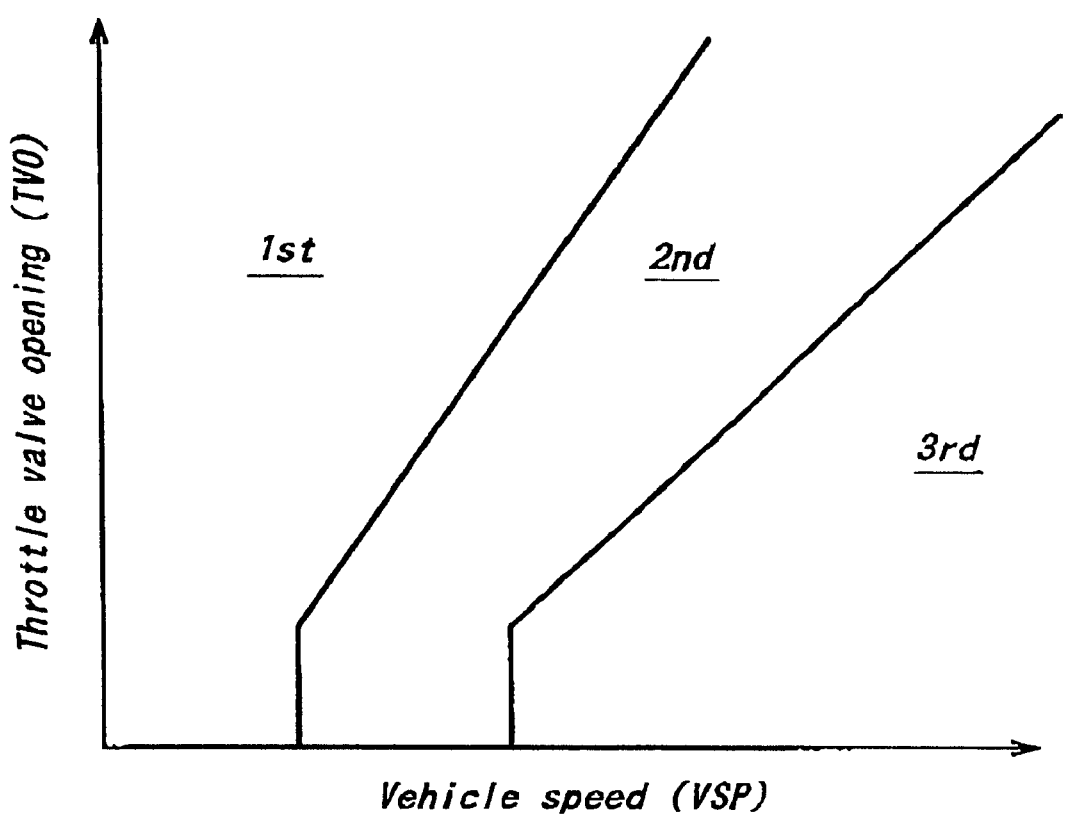
FIG. 5 is a shift map showing a typical shift pattern of an automatic transmission.

Based on the throttle valve opening TVO and the vehicle speed VSP of the above-mentioned input information, the transmission controller 9 carries out shift control in the manner to be described hereinafter, based on algorithm known, per se. Specifically, the transmission controller 9 determines the optimum shift range for the present driving condition based on a predetermined shift pattern typically shown in FIG. 5, and performs a predetermined shift operation by turning on and off the shift solenoids 6 and 7 so that the optimum shift range is selected from the throttle valve opening TVO and the vehicle speed VSP detected by the respective sensor 10, 11.

Based on the above-mentioned input information, the transmission controller 9 further controls the line pressure according to the transmission input torque transmitted from the torque converter 3 to the automatic transmission 2. On this occasion, the transmission controller 9 determines the target line pressure from the transmission input torque, and sends the drive duty D for causing the line pressure to coincide with this target value. The transmission controller 9 determines the transmission input torque in the manner to be described hereinafter, by executing a control program shown in FIG. 2, so as to carry out the line pressure control.

Figure 3:
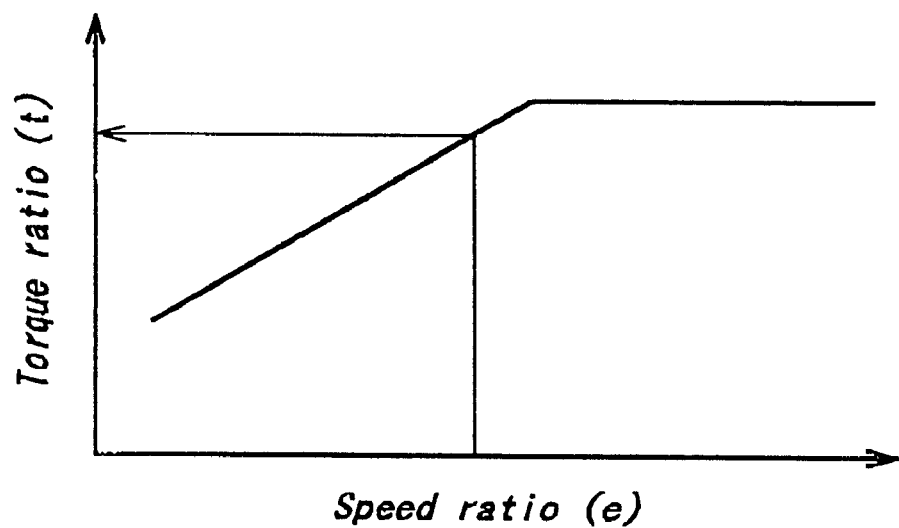
FIG. 3 is a diagram showing a typical relationship between the speed ratio and the torque ratio of a torque converter.

First of all, in step 21, the output torque (engine torque) $T_e$ of the engine 1 is estimated, for example, from the throttle valve opening TVO (engine load) and the engine rotational speed $N_e$ by a method described in JP 3-41256A, the disclosure of which is herein incorporated by reference. Next, in step 22, a speed ratio e (or E) ($=N_t/N_e$) of the torque converter represented by the ratio of the turbine rotational speed (torque converter output rotational speed) $N_t$ to the engine rotational speed (torque converter input rotational speed) $N_e$ is calculated. Furthermore, in step 23, a torque ratio t of the torque converter 3 is calculated from the torque converter speed ratio e (or E) based on a performance diagram of the torque converter 3, such as that shown in FIG. 3, for example.

In the next step 24, judgment is made as to whether or not the time elapsed after the engine 1 is made in a no-load state is within a predetermined time. Here, the predetermined time is defined as a response delay of estimation of the engine torque $T_e$ as described above with reference to step 21, i.e., a time corresponding to a follow-up delay time of the engine torque estimation value $T_e$ with respect to the decrease in the actual engine torque due to the no-load state of the engine.

If it is judged in step 24 that the predetermined time has elapsed after the engine 1 is made in a no-load state, in step 25, a turbine torque correction factor $\epsilon$ is set at 1. If, on the contrary, the time elapsed after the engine 1 is made in a no-load state is within the predetermined time, the control proceeds to step 26 where the turbine torque correction factor $\epsilon$ is set at $\epsilon'$, which is smaller than 1. This correction factor $\epsilon'$ is determined in advance as a factor that exactly compensates for the deviation of the engine torque estimation value $T_e$ from the actual engine torque due to the engine torque estimation response delay generated upon shifting to the engine no-load state.

In step 27, the turbine torque $T_t$ ($=T_e \times t \times \epsilon$) is calculated by multiplying the turbine torque correction factor $\epsilon$ set as described above with reference to step 25 or 26, by the engine torque estimation value $T_e$ estimated in step 21 and the torque ratio t calculated in step 23. This turbine torque $T_t$ is the transmission input torque, and can be determined intrinsically only by ($T_e \times t$). However, by further multiplying the turbine torque correction factor $\epsilon$, the deviation of the engine torque estimation value $T_e$ from the actual engine torque caused by the engine torque estimation response delay generated upon shifting to the engine no-load state is compensated, and the calculated turbine torque $T_t$ is caused to coincide with the actual turbine torque despite the engine torque estimation response delay upon shifting to the no-load state.

Figure 4:
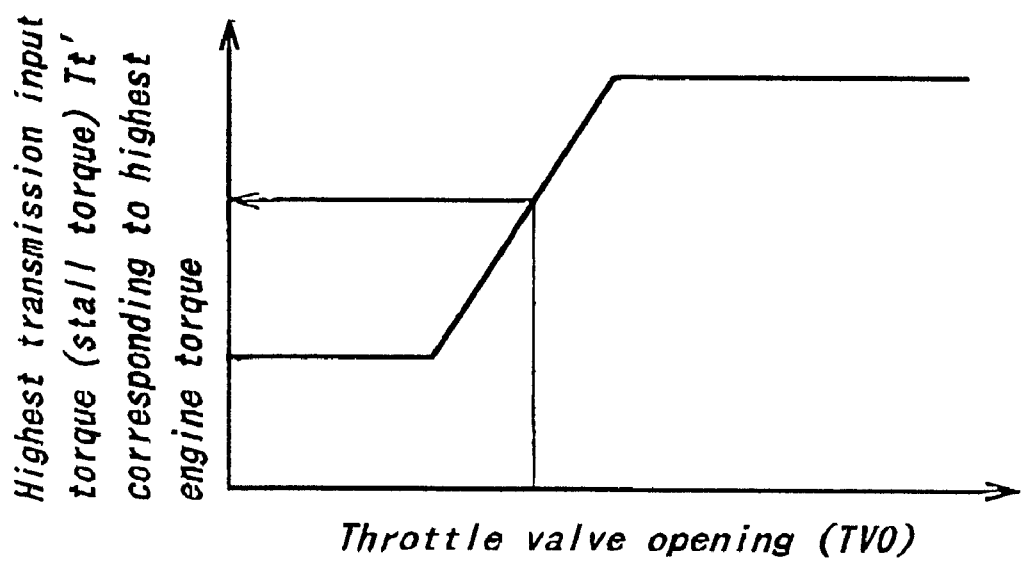
FIG. 4 is a stall torque diagram typically showing a highest transmission input torque corresponding to a highest engine torque capable of being generated for each throttle valve opening.

In the following step 28, the highest turbine torque (stall torque) $T_t'$, which corresponds to the highest engine torque that can be generated at the current throttle valve opening TVO, is determined based on a stall torque map such as that shown in FIG. 4, for example. Next, in step 29, a check is made as to whether the transmission hydraulic oil temperature C is a low temperature (less than a low-side predetermined value $C_L$), a middle temperature (between the low-side predetermined value $C_L$ and a high-side predetermined value $C_H$), or a high temperature (exceeding the high-side predetermined value $C_H$).

If the transmission hydraulic oil temperature C is a low temperature, the control proceeds to step 30 where a sudden depression judgment value (setting rate of the engine load increase rate) K is set at $K_L$ for low temperature. Here, the sudden depression judgment value is used to judge whether or not the increase rate of the throttle valve opening TVO (engine load) due to depression of the accelerator pedal corresponds to sudden depression of the accelerator pedal such as to produce a deficiency of the line pressure due to the engine torque estimation delay with respect to the increase in the actual engine torque. If the transmission hydraulic oil temperature C is a middle temperature, the control proceeds to step 31 where the sudden depression judgment value K is set at $K_M$ for middle temperature. Similarly, if the transmission hydraulic oil temperature C is a high temperature, the control proceeds to step 32 where the sudden depression judgment value K is set at $K_H$ for high temperature. It is assumed that the sudden depression judgment value $K_L$ for the low temperature is made smaller than the sudden depression judgment value $K_M$ for the middle temperature, and the sudden depression judgment value $K_M$ for the middle temperature is made smaller than the sudden depression judgment value $K_H$ for high temperature. In this way, the sudden depression judgment value K or the setting rate of the engine load increase rate is set so as to be smaller at lower temperature. Thus, at a lower temperature condition, it is possible to enhance the sensitivity of the judgment relating to a sudden depression of the accelerator pedal such as to produce a deficiency of line pressure due to the engine torque estimation delay.

In the next step 33, the throttle valve opening rate dTVO/dt (i.e., throttle valve opening increase rate or engine load increase rate) in one calculation cycle is calculated by subtracting the throttle valve opening $TVO_{OLD}$ before one calculation cycle from the current throttle valve opening TVO. In step 34, judgment is made as to whether or not the time, which has elapsed after the throttle valve opening rate dTVO/dt reaches a sudden depression state (engine load sudden increase state) not lower than the sudden depression judgment value or the setting rate of the engine load increase rate K set in steps 30, 31 and 32, is within a predetermined time.

The predetermined time in step 34 is defined as a response delay of the estimation of the engine torque $T_e$ as described above with reference to step 21, i.e., the time corresponding to a follow-up delay time of the engine torque estimation value $T_e$ with respect to increase in the actual engine torque due to the sudden depression state (engine load sudden increase state). If it is judged in step 34 that the time elapsed after the throttle valve opening change rate dTVO/dt reaches a sudden depression state not lower than the sudden depression judgment value K (engine load sudden increase state) is within the predetermined time, since the response delay of estimation of the engine torque $T_e$ in step 21 produces a deficiency of the line pressure, the control proceeds to step 35 where MAX ($T_t$, $T_t'$), which is the larger of the turbine torque $T_t$ calculated in step 27 and the stall torque $T_t'$ determined in step 28, is selected and used as a transmission input torque $T_i$ to carry out the line pressure control. However, since $T_t$ is naturally lower than $T_t'$ as can be appreciated from the foregoing description, MAX ($T_t$, $T_t'$) is substantially equal to $T_t'$ and thus, the line pressure control is carried out based on the stall torque $T_t'$.

If it is judged in step 34 that the predetermined time has elapsed after the throttle valve opening rate dTVO/dt reaches a sudden depression state not lower than the sudden depression judgment value K or the engine load sudden increase state, or if it is judged that a sudden depression state of dTVO/dt≧K (engine load sudden increase state) is not established, since the response delay of estimation of the engine torque $T_e$ in step 21 does not produce a deficiency of the line pressure, the control proceeds to step 36 where the turbine torque $T_t$ calculated in step 27 is used as the transmission input torque $T_i$ to carry out the line pressure control.

Figure 2:
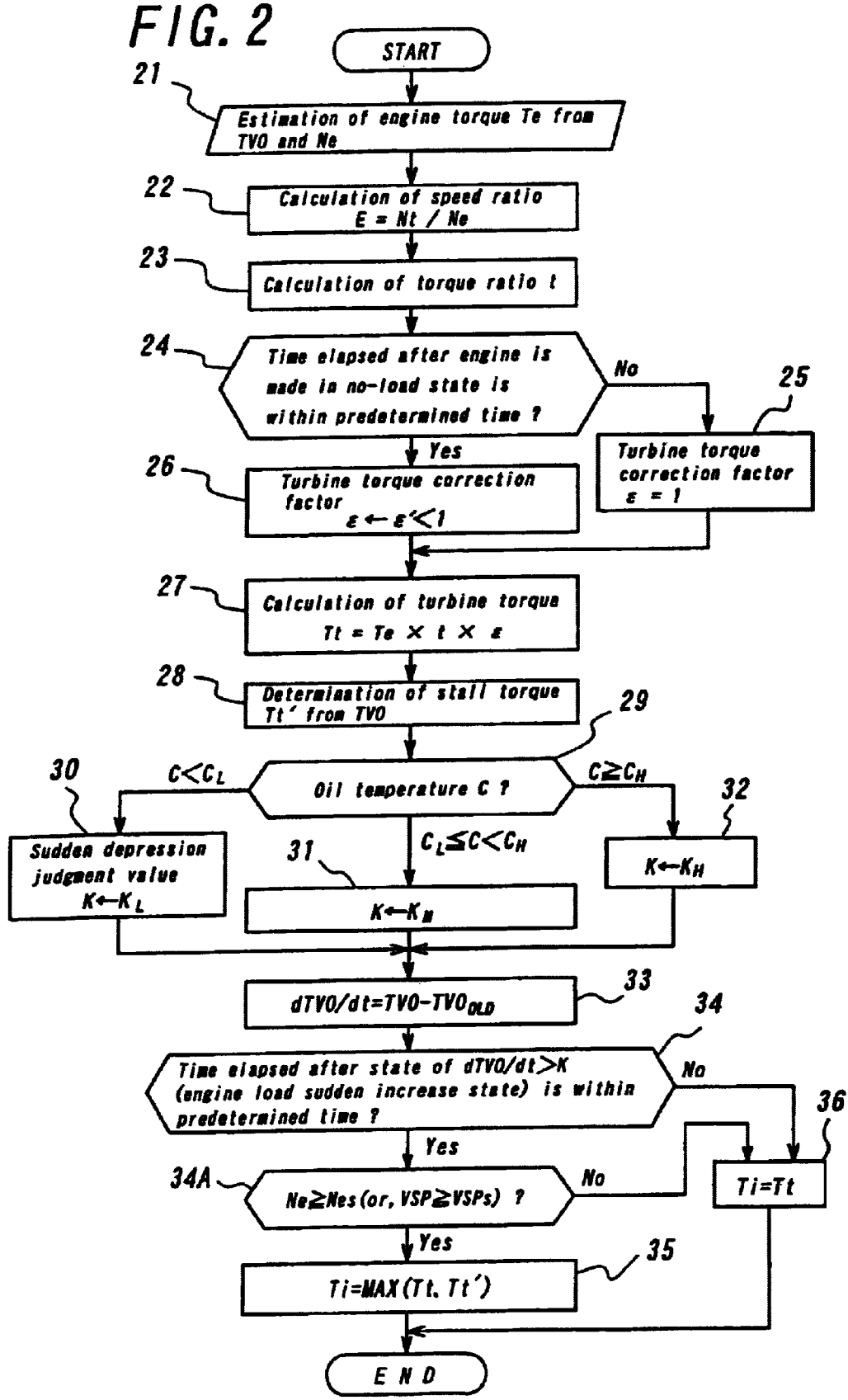
FIG. 2 is a flowchart of a control program executed by a transmission controller in FIG. 1, for determining a transmission input torque for the line pressure control.

It is noted that the line pressure control using MAX ($T_t$, $T_t'$) as the transmission input torque $T_i$ in step 35 is carried out based on evaluation of the engine operating condition at step 34A shown in FIG. 2. More specifically, such a line pressure control is carried out only when the operating condition is in a high rotation region not lower than a predetermined engine rotational speed Nes (i.e., Ne≧Nes), or only when the operating condition is in a high vehicle speed region not lower than a set vehicle speed VSPs (i.e., VSP≧VSPs). In these conditions, otherwise, the change in actual engine torque is so rapid that the above-mentioned problem arising from the relative estimation delay of the engine torque would become noticeable.

In the illustrated embodiment, the output torque $T_e$ of the engine 1 is estimated from the operating condition (throttle valve opening TVO and engine rotational speed $N_e$) (step 21), the input torque ($T_e$×t) of the automatic transmission 2 is calculated from the estimated engine torque $T_e$ and the operation state (torque ratio t) of the torque converter 3 (step 27), and during the predetermined time corresponding to the engine torque estimation response delay after the engine is made in the no-load state (step 24), the calculated input torque ($T_e$×t) of the automatic transmission is decreased for correction (ε<1) (steps 26 and 27), with which the line pressure control is carried out (step 36). Thus, when the engine load is decreased, the transmission input torque calculation value ($T_e$×t×ε) is decreased so as to avoid an excess of the line pressure due to an engine torque estimation delay with respect to the actual engine torque. It is also possible to solve the problems of deterioration in the fuel consumption due to unnecessary increase in the oil pump drive load, and/or deterioration in the shift feel due to a shift shock caused by the excess of line pressure shock.

During the predetermined time corresponding to the engine torque estimation response delay after the transfer to the engine load sudden increase state in which the increase rate dTVO/dt of the engine load (i.e., throttle valve opening TVO) is not lower than the set rate K (step 34), the input torque $T_t'$ (FIG. 4) of the automatic transmission at the time of the highest engine torque that can be generated under the increased engine load is used to carry out the line pressure control (step 35). Thus, when the engine load is increased, the highest engine torque that can be generated under the increased engine load is used in place of the engine torque estimation value $T_e$ to carry out the line pressure control. For this reason, it is possible to eliminate deficiency of the line pressure due to the engine torque estimation delay with respect to the increase in the actual engine torque caused by the increase in engine load, and to avoid the problems of the transmission loss and the decrease in the durability, or a retarded sense of the shift operation.

In the illustrated embodiment, furthermore, the set rate K relating to the engine load increase rate is decreased with a decrease in the hydraulic oil temperature C of the automatic transmission so as to enhance the sensitivity of engine load sudden increase judgment. It is noted that, in a low temperature condition, the viscosity of the hydraulic oil is high and the transmission capacity of the torque converter is higher than that at the time of high temperature. Therefore, the increase in actual engine torque caused by the increase in engine load is easily transmitted to the transmission, and the above-mentioned problem arising from the relative estimation delay of the engine torque becomes noticeable. However, according to the illustrated embodiment, since the sensitivity of the engine load sudden increase judgment is enhanced at a lower temperature condition as described above, with a decrease in temperature, it is possible to readily perform the judgment of the engine load increase state in which the line pressure control should be carried out based on the transmission input torque $T_i$ in step 35. It is therefore possible to positively solve the problem due to the estimation delay of the engine torque, which has become noticeable as described above, and to reliably achieve the above-mentioned operation and effects at any oil temperature conditions.

In the illustrated embodiment, moreover, the operation in which the input torque $T_t'$ of the automatic transmission at the time of the highest engine torque is used for the line pressure control in step 35 is allowed only in the high rotation region in which the engine rotational speed is not lower than the predetermined rotational speed, or only in the high vehicle speed region in which the vehicle speed is not lower than the predetermined vehicle speed. Therefore, it is possible to carry out the line pressure control based on the input torque $T_t'$ in step 35 only when the change in the actual engine torque is rapid and the problem due to the relative estimation delay of engine torque is noticeable, without carrying out the control under unnecessary conditions.

While the present invention has been described above with reference to a specific embodiment shown in the accompanying drawings, it has been presented for an illustrative purpose only, and various changes or modifications may be made without departing from the scope of the invention as defined by the appended claims.

What is claimed is:

1. A line pressure control system for an automatic transmission wherein a shift range is determined by selectively engaging friction elements by means of a line pressure controlled according to an input torque of said automatic transmission, comprising:

estimation means for estimating an engine output torque at a front stage of said automatic transmission, from an operating condition of the engine;

calculation means for calculating the input torque of said automatic transmission from the estimated engine output torque and an operation state of a torque converter; and correction means for decreasing the calculated input torque of said automatic transmission, during a predetermined time corresponding to an estimation response delay of the engine output torque after said engine is made in a no-load state, so as to control said line pressure.

2. The line pressure control system according to claim 1, wherein, during the predetermined time corresponding to an estimation response delay of the engine output torque, after the engine load is transferred to a sudden increase state in which the increase rate of the load of said engine is not lower than a predetermined rate, the input torque of said automatic transmission at the time of the highest engine torque that can be generated under the increased engine load is used for said line pressure control.

3. The line pressure control system according to claim 2, wherein said predetermined rate relating to the increase rate of said engine load is changed according to a hydraulic oil temperature of said automatic transmission, and said predetermined rate is decreased as the temperature decreases so as to enhance sensitivity of judgment for the engine load sudden increase state.

4. The line pressure control system according to claim 2, wherein the line pressure control based on the input torque of said automatic transmission at the time of said highest engine torque is performed only in a high rotation region in which an engine rotational speed is not lower than a predetermined value.

5. The line pressure control system according to claim 2, wherein the line pressure control based on the input torque of said automatic transmission at the time of said highest engine torque is performed only in a high vehicle speed region in which a vehicle speed is not lower than a predetermined vehicle value.

6. The line pressure control system according to claim 3, wherein the line pressure control based on the input torque of said automatic transmission at the time of said highest engine torque is performed only in a high rotation region in which an engine rotational speed is not lower than a predetermined value.

7. The line pressure control system according to claim 3, wherein the line pressure control based on the input torque of said automatic transmission at the time of said highest engine torque is performed only in a high vehicle speed region in which a vehicle speed is not lower than a predetermined vehicle value.

* * * * *